(12) United States Patent
Gradl et al.

(10) Patent No.: US 9,835,114 B1
(45) Date of Patent: Dec. 5, 2017

(54) FREEFORM DEPOSITION METHOD FOR COOLANT CHANNEL CLOSEOUT

(71) Applicant: The United States of America as Represented by the Administrator NASA, Washington, DC (US)

(72) Inventors: Paul R. Gradl, Owens Cross Roads, AL (US); David Christopher Reynolds, Madison, AL (US); Bryant H. Walker, Palm City, FL (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 15/615,539

(22) Filed: Jun. 6, 2017

(51) Int. Cl.
| | | |
|---|---|---|
| *B23P 15/00* | (2006.01) | |
| *F02K 9/97* | (2006.01) | |
| *F02K 9/64* | (2006.01) | |
| *B23K 26/282* | (2014.01) | |

(52) U.S. Cl.
CPC .......... *F02K 9/972* (2013.01); *B23K 26/282* (2015.10); *B23P 15/008* (2013.01); *F02K 9/64* (2013.01); *B23P 2700/06* (2013.01); *B23P 2700/13* (2013.01); *F05D 2230/234* (2013.01); *F05D 2230/237* (2013.01)

(58) Field of Classification Search
CPC ..... B23P 15/02; B23P 15/008; B23P 2700/13; B23P 2700/06; F05D 2230/232; F05D 2230/234; F05D 2230/90; F05D 2230/237; F05B 2230/232; F05B 2230/234; F05B 2230/90; F05B 2230/237

USPC .......... 219/121.63, 121.64, 121.78; 228/225, 228/224, 247, 41
See application file for complete search history.

(56) References Cited

U.S. PATENT DOCUMENTS

| 4,707,225 | A | 11/1987 | Schuler et al. |
| 4,942,653 | A | 7/1990 | Hawkinson |
| 5,249,357 | A | 10/1993 | Holmes et al. |
| 5,532,452 | A | 7/1996 | Lechner et al. |
| 6,405,435 | B1 * | 6/2002 | Konter ............... B22D 11/0405 29/889.7 |
| 6,470,671 | B1 | 10/2002 | Kretschmer |

(Continued)

OTHER PUBLICATIONS

Gradl, Paul R., Rapid Fabrication Techniques for Liquid Rocket Channel Wall Nozzles, 52nd AIAA/SAE/ASEE Joint Propulsion Conference, Jul. 25, 2016, 1-21 pgs., AIAA-2016-4771, Salt Lake City, UT.

*Primary Examiner* — Christopher Besler
(74) *Attorney, Agent, or Firm* — James J. McGroary; Mark P. Dvorscak (57) ABSTRACT

A method is provided for fabricating a coolant channel closeout jacket on a structure having coolant channels formed in an outer surface thereof. A line of tangency relative to the outer surface is defined for each point on the outer surface. Linear rows of a metal feedstock are directed towards and deposited on the outer surface of the structure as a beam of weld energy is directed to the metal feedstock so-deposited. A first angle between the metal feedstock so-directed and the line of tangency is maintained in a range of 20-90°. The beam is directed towards a portion of the linear rows such that less than 30% of the cross-sectional area of the beam impinges on a currently-deposited one of the linear rows. A second angle between the beam and the line of tangency is maintained in a range of 5-65°.

18 Claims, 9 Drawing Sheets

(56) References Cited

U.S. PATENT DOCUMENTS

| | | |
|---|---|---|
| 6,945,032 B2 | 9/2005 | Lundgren |
| 7,188,417 B2 | 3/2007 | Weeks |
| 7,596,940 B2 | 10/2009 | Fint et al. |
| 8,127,443 B2 | 3/2012 | Fint et al. |
| 8,448,335 B2 | 5/2013 | Lundgren et al. |
| 2005/0166398 A1 | 8/2005 | Weeks |
| 2009/0100678 A1 | 4/2009 | Fint et al. |
| 2010/0170634 A1* | 7/2010 | Nishino .............. B29C 65/1635 156/272.8 |
| 2011/0192137 A1 | 8/2011 | Maeding |
| 2015/0048065 A1* | 2/2015 | Berger ................ B23K 9/1735 219/121.63 |

* cited by examiner

FREEFORM DEPOSITION METHOD FOR COOLANT CHANNEL CLOSEOUT

ORIGIN OF THE INVENTION

The invention described herein was made in part by an employee of the United States Government and may be manufactured and used by and for the Government of the United States for governmental purposes without the payment of any royalties thereon of therefor.

BACKGROUND OF THE INVENTION

1. Field of the Invention

This invention relates to the fabrication of nozzles or combustion chambers. More specifically, the invention is freeform deposition method for the closeout of coolant channels in the liners of nozzles and combustion chambers found in rockets and nuclear reactors.

2. Description of the Related Art

Rocket nozzles and combustion chambers used in rocket engines and nuclear reactors operate in extreme environments and require unique features to ensure the hardware operates safely and meets performance requirements. Combustion chambers and nozzles are exposed to high temperature gases generated from combustion byproducts. These high temperatures require unique structural features that are used to dissipate heat and properly cool walls of combustion chambers and nozzles. Combustion chambers and nozzles are contoured to allow these gases to expand and provide the necessary thrust and performance characteristics for the engine. The "hot wall" of a nozzle or combustion chamber is the wall exposed to the gaseous byproducts of combustion. A regenerative cooling scheme is typically incorporated into the wall design of combustion chambers and nozzles to maintain safe operating temperatures of the walls and increase the temperature of the fluid used for downstream processes. Regenerative cooling is a configuration in which some or all of the rocket propellant is passed through coolant channels, or tubes, or in a jacket around the combustion chamber or rocket nozzle to cool the walls of the combustion device's components.

Rocket nozzle or combustion chamber walls are formed using a series of thin-walled coolant tubes or integrally-machined coolant channels. These coolant channels run along the length of the component and are connected by an inlet and outlet manifold to distribute the fluid. Typically, a combustion chamber or nozzle incorporates an inner liner that has integral coolant channels for cooling the hot wall of the chamber or nozzle. These coolant channels must be covered to contain coolant fluid where such covering is known as channel "closeout". Since the coolant fluids are generally under high pressure, coolant channel closeouts must be reliable as they experience high strains and cycling under extreme pressures and temperatures.

Prior channel wall designs include the fabrication of an inner liner with machined coolant channels. These coolant channels are typically filled with wax and electrodeposited/plated with copper (e.g., see U.S. Pat. No. 5,249,357 to Holmes et al.) or nickel to form the closeout of the coolant channels and then further plasma sprayed to provide structure. The wax is melted out of the channels and a structural jacket is welded to the electrodeposited closeout. Nozzles manufactured via the Holmes et al. method can only be operated under limited temperatures due to the bond strength of the electrodeposited interface. Further, the Holmes et al. process of closeout exhibits significant limitations to include the introduction of impurities into the metal causing downstream issues during the welding step, and the extensive fabrication time required to fabricate a single chamber or nozzle thereby increasing the cost of production. Because Holmes et al. requires metal to be deposited at high temperatures in a vacuum chamber, the coefficients of thermal expansion of the two metals employed must be closely matched during the process to prevent cracking of the metal when the rocket nozzle or chamber cools. The use of a vacuum in the Holmes et al. process also limits the size of the ultimate nozzle or combustion chamber that can be fabricated.

In another prior art approach, Fint et al. (U.S. Pat. Nos. 7,596,940 and 8,127,443) discloses a method of fabricating a rocket engine nozzle comprising brazing of a slotted or channeled inner liner into a rocket engine nozzle jacket under controlled conditions. The process of manufacturing this assembly can be complex. The nozzle liner is often spun formed or machined from forgings prior to final machining and slotting to produce a component for brazing. Further, a match-machined mating closeout jacket must be precisely machined to provide minimal gaps for the subsequent brazing operation. Prior to the jointure of the inner liner and the outer jacket, plating is completed and a brazing foil applied. Next, the nozzle is brazed using a pressure-assisted braze furnace with high temperature, high-pressure and vacuum required to be applied within the coolant channels. This method requires significant handling, extensive tooling, and there is only one opportunity for an acceptable braze bond of the outer jacket to the inner liner. This process often requires specialized furnaces limiting the size of any components that can be produced. Upon completion of the brazing process, there is not a reliable inspection method to determine which areas were adequately brazed. The challenges in this process increase significantly with increases in the size of the ultimate combustion chamber or nozzle.

Laser welding closeout techniques are disclosed in U.S. Pat. No. 6,945,032 to Lundgren and U.S. Pat. No. 7,188,417 to Weeks. Briefly, these techniques include welding a metal sheet over an inner liner having coolant channels machined therein. There is no direct means of inspecting the resulting welds even though the welds must be precisely tracked due to the very thin channel lands on the inner liner.

SUMMARY OF THE INVENTION

Accordingly, it is an object of the present invention to provide a method of closing out coolant channels on rocket nozzles and combustion chambers.

Another object of the present invention is to provide a coolant channel closeout method for rocket nozzles and combustion chambers that is not constrained by the size of the ultimate nozzle or combustion chamber.

Still another object of the present invention is to provide a coolant channel closeout method for rocket nozzles and combustion chambers in which the closeout material is securely bonded to the nozzle or combustion chamber.

Other objects and advantages of the present invention will become more obvious hereinafter in the specification and drawings.

In accordance with the present invention, a method is provided for the fabrication of a coolant channel closeout jacket. The method operates on a structure having coolant channels formed in an outer surface thereof wherein a line of tangency relative to the outer surface is defined for each point on the outer surface. A feedstock supply is provided for depositing linear rows of a metal feedstock onto the outer surface of the structure. An energy source is provided for generating a beam of weld energy. The feedstock supply is positioned to deposit the linear rows of metal feedstock onto a portion of the structure's outer surface where the coolant channels are formed. A first angle between the metal feedstock discharged from the feedstock supply and the line of tangency is maintained in a range of 20-90°. The energy source is positioned to direct the beam of weld energy towards a portion of the linear rows deposited on the coolant channel portion of the structure's outer surface such that less than 30% of the cross-sectional area of the beam of weld energy impinges on a currently-deposited one of the linear rows. A second angle between the beam of weld energy and the line of tangency is maintained in a range of 5-65°.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

The present invention is directed to a new method and system for use in the fabrication of rocket engine nozzles, rocket thrust or combustion chambers, and other regenerative cooling systems, such as cooling systems used in nuclear reactors. While this invention is susceptible to embodiment in many different forms, there are shown in the drawings and will herein be described in detail, several embodiments with the understanding that the present disclosure should be considered as an exemplification of the principles of the invention and is not intended to limit the invention to the embodiments so illustrated. For purpose of illustration, the present invention will be described herein for coolant channel closeout in a rocket nozzle. Accordingly, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but are not necessarily, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified embodiment. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Figure 1:
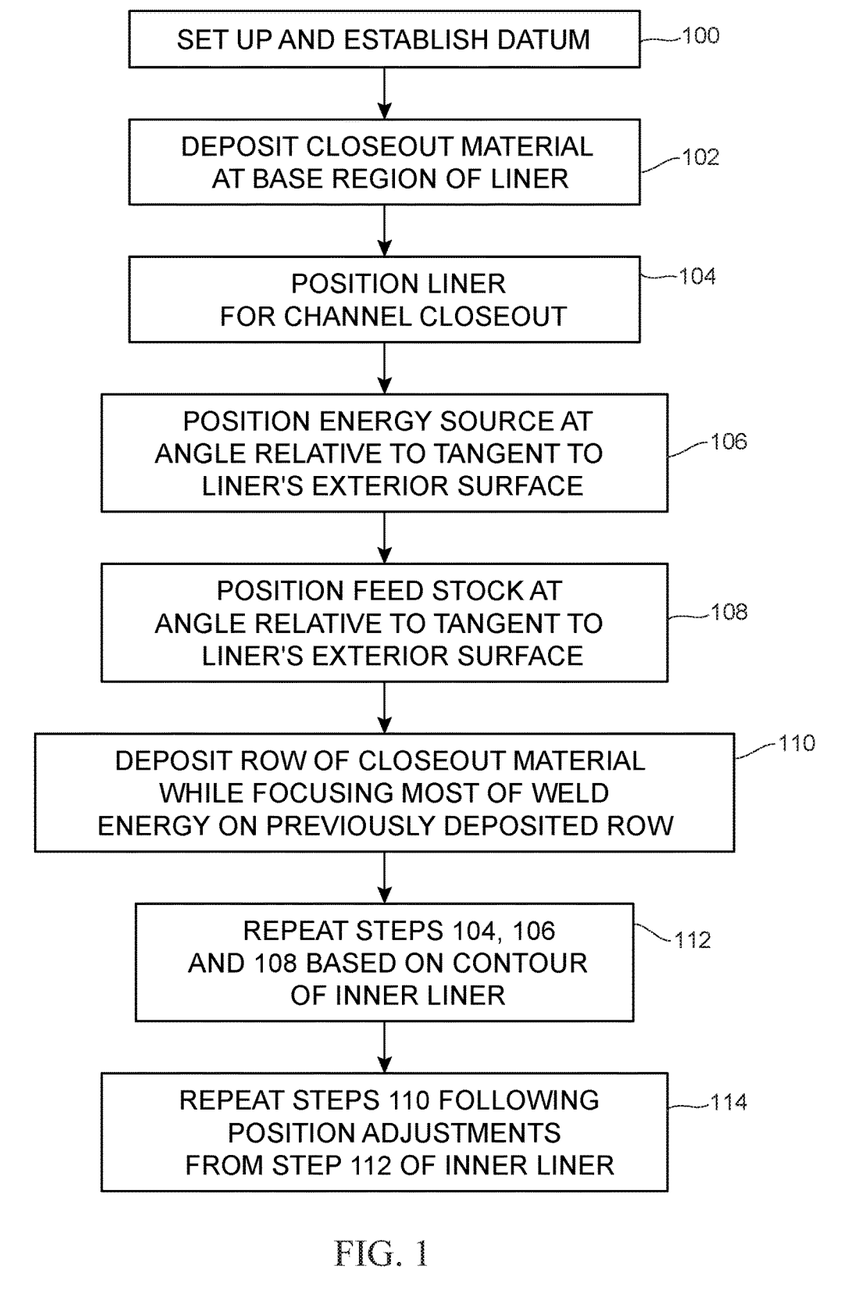
FIG. 1 is a top-level flow diagram of a freeform deposition method for the closeout of coolant channels in accordance with an embodiment of the present invention.

FIG. 1 sets forth the steps of the freeform deposition closeout method used to fabricate coolant channel closeout of an inner liner of a rocket nozzle, rocket thrust or combustion chamber, or any structure having coolant channels that must be closed out. This method fabricates an external metal jacket onto a pre-fabricated metal inner liner having integrated coolant channels. Such metal inner liners are typically made from copper (e.g., for combustion chambers) or stainless/Inconel (e.g., for nozzles), while the external closeout material is typically a high-strength stainless steel alloy or superalloy having the strength needed to contain high operational pressures that will exist in coolant channels. The freeform deposition closeout method described herein speeds up the production of both a rocket nozzle or rocket thrust chamber enabling their manufacture within a significantly reduced timeframe. The process steps will be described briefly below, and then in greater detail with reference to additional figures.

Step 100 involves the set up and establishment of datum/ parameters for the operation of the method as would be understood in the art of robotic welding operations. In general, the present invention provides for the deposition of rows of closeout material on a pre-fabricated inner liner as relative rotation is introduced between the inner liner and the source of closeout material being deposited. Accordingly, in step 102, an inner liner previously fabricated with coolant channels is placed in either a vertical or horizontal position, and coolant channel closeout material is deposited in rows along the outer circumference of the inner liner at a base region thereof where there are no coolant channels. Step 102 is repeated until the region of the inner liner having coolant channels is reached. Next, at step 104, the inner liner is positioned in accordance with angular specifications (to be described further below) prior to starting channel closeout procedures. At step 106, the energy source is positioned at an angle relative to a line projected tangentially along the exterior surface of the inner liner. At step 108, the metal feedstock used to create the external jacket is positioned at an angle relative to the line projected tangential to the exterior surface of the inner liner. Next, at step 110, a row of closeout material is deposited from the feedstock onto the area containing the coolant channel lands. The energy source's energy beam is applied to the metal feedstock being deposited so that a greater amount of the weld energy is focused on the previously-deposited row of closeout material than on the currently-deposited row of closeout material. This process allows adequate bonding to each row of closeout material to the channel lands without deforming either feature. Each row of closeout material is deposited while the inner liner is being rotated/repositioned relative to the metal feedstock source. Since the outer contour of a rocket nozzle or thrust chamber is curvilinear, it is necessary to adjust the position(s) of the inner liner and/or the closeout material's deposition and welding sources to maintain appropriate angles relative to the above-referenced tangent line. Accordingly, step 112 involves repeating steps 104, 106, and 108 based on the contour of the outer surface of the inner liner so that appropriate angles are maintained relative to the line projected tangential to the outer surface of the inner liner. Next, at step 114, deposition step 110 is repeated following the position adjustments of step 112. As will be explained further below, each row of closeout material deposition begins at a point different from the starting point of the immediately-previous row.

Figure 2:
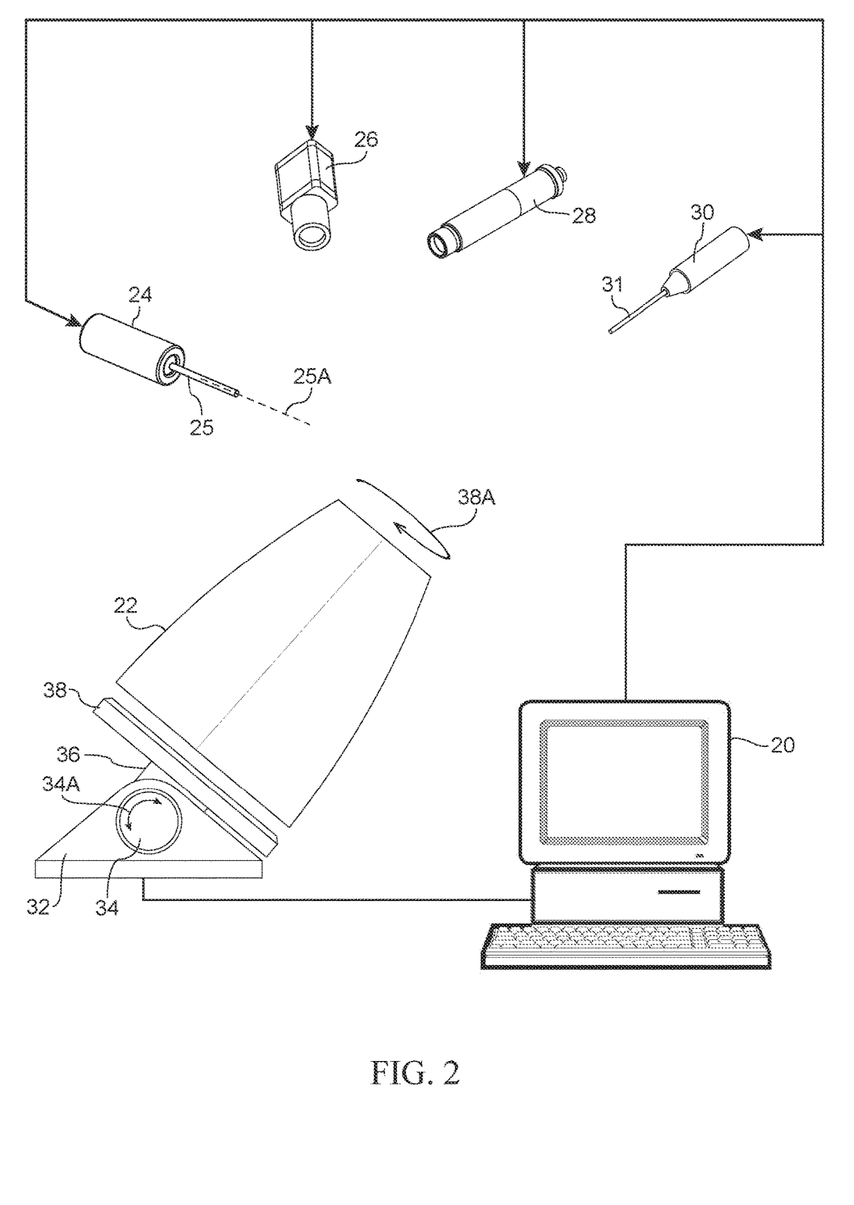
FIG. 2 is a top-level schematic view of a system for implementing the freeform deposition method in accordance with an embodiment of the present invention.

The necessary components to practice the present invention's "freeform closeout method" are depicted in FIG. 2. Computer 20 is programmed to run the method of FIG. 1. Computer 20 may be a personal computer, a personal logic controller, or other processing system. The freeform closeout method may be pre-programmed into computer 20, guided by machine vision, or a combination of the two. Computer 20 monitors and controls (as indicated by the solid lines of connectivity) all of the components used in the present invention. Such components can include, but are not limited to: wire feed unit 24, camera 26, pyrometer 28, energy source and purge unit 30, and turntable 38 mounted on a base 32. Other components may be added. For example, an additional purge nozzle may be added to help prevent oxidation of the welds created during coolant channel closeout.

The geometry of the inner liner having coolant channels along its length can vary and is generally derived or programmed into computer 20 directly from a CAD model. Because this is an automated process controlled by computer 20, a closed loop feedback mechanism may be incorporated to adjust the process to ensure the quality of the weld. The welding method herein allows full visual access for a variety of sensors including digital videography or photography using camera 26 and infrared measurements using pyrometer 28 or infrared thermography. This provides valuable process information in real-time to monitor and regulate heat input, and to detect defects/anomalies in real-time so that the freeform deposition closeout method can be stopped or adjusted as necessary. Since the external metal jacket closing out the coolant channels is being built onto the inner liner in rows, a localized defect can be repaired using machining, grinding, or alternate techniques, and the building process continued. This is a significant advantage over the current methods that do not allow any opportunity for repair during the closeout process.

In general, the present invention uses a robotic laser beam welding system wherein a wire-based fusion welding system is used to create a freeform deposition shell or external jacket onto the outside of a rocket nozzle inner liner or a rocket thrust chamber inner liner. Alternate embodiments of this method may include a robotic pulsed-arc/pulsed MIG, hotwire welding (combined MIG preheat and laser beam), an electron beam, or other methods to weld a metal feedstock. The metal feedstock may be deposited-wire or deposited-powder melted within the energy source. As is known in the art, wire feed unit 24 can include a control switch, a contact tip, a power cable, a gas nozzle, an electrode conduit and liner, and a gas hose. The control switch, or trigger, when initiated by the processor, initiates the wire feed, electric power, and the inert shielding gas flow, causing an electric arc to be struck when using a pulsed-arc method. When used with a laser beam, wire feed unit 24 only requires the metal feed stock and inert shielding gas to be initiated. Most wire feed units 24 provide wire through a nozzle 25 at a constant feed rate, but more advanced machines can vary the feed rate in response to variable energy of the directed energy source.

The present invention can be implemented using one or more camera(s) 26 to enable the real-time observation of each individual weld and, thus, permit real-time correction of any welding errors thereby reducing the overall time for fabrication of a regenerative cooling system. Camera(s) 26 can be one or more laser triangulation cameras 26 for online monitoring of the weld bead geometry right after the welding point. Pyrometer 28 may comprise both an optical system and thermal detection device. An optical high-speed pyrometer 28 mounted coaxially or off-axis on the laser welding head may be connected through an optical fiber to provide temperature measurements of the focal spot area at a frequency up to 40 kHz. A back-reflection sensor can be mounted coaxially or off-axis on the optical head of pyrometer 28. Thermal radiation and back-reflection sensing spots may be centered on the energy or laser focal spot. Pyrometer 28 uses changes in temperature, including temperature drops, to detect welding defects that may need correction.

Energy source and purge unit 30 can include both an energy source (e.g., a laser generating a beam 31 of weld energy) to melt/fuse (i.e., weld) the feedstock supplied via wire feed unit 24, and a gas purge used to shield both sides of the weld while forming the external jacket. The purge function of energy source and purge unit 30 prevents oxidation of the deposited or welded closeout material. Although not required, an additional purge nozzle may be added to further enhance the quality of the metal jacket fabricated onto the inner liner. A rocket nozzle inner liner 22 (with integrated coolant channels being omitted from this illustration thereof) is positioned onto turntable 38. Turntable 38 can be repositioned by a pivoting support 34 coupled to a base 32 and a support arm 36 so that inner liner 22 is positioned at certain angles that can vary during fabrication in order to facilitate the formation of an external jacket onto inner liner 22. Pivoting movement of pivoting support is indicated by two-headed arrow 34A. As would be well understood in the art, pivoting support 34 and turntable 38 are responsive to the commands of computer 20. Other components can be coupled to computer 20 to assist in the implementation of the method herein.

Figure 3:
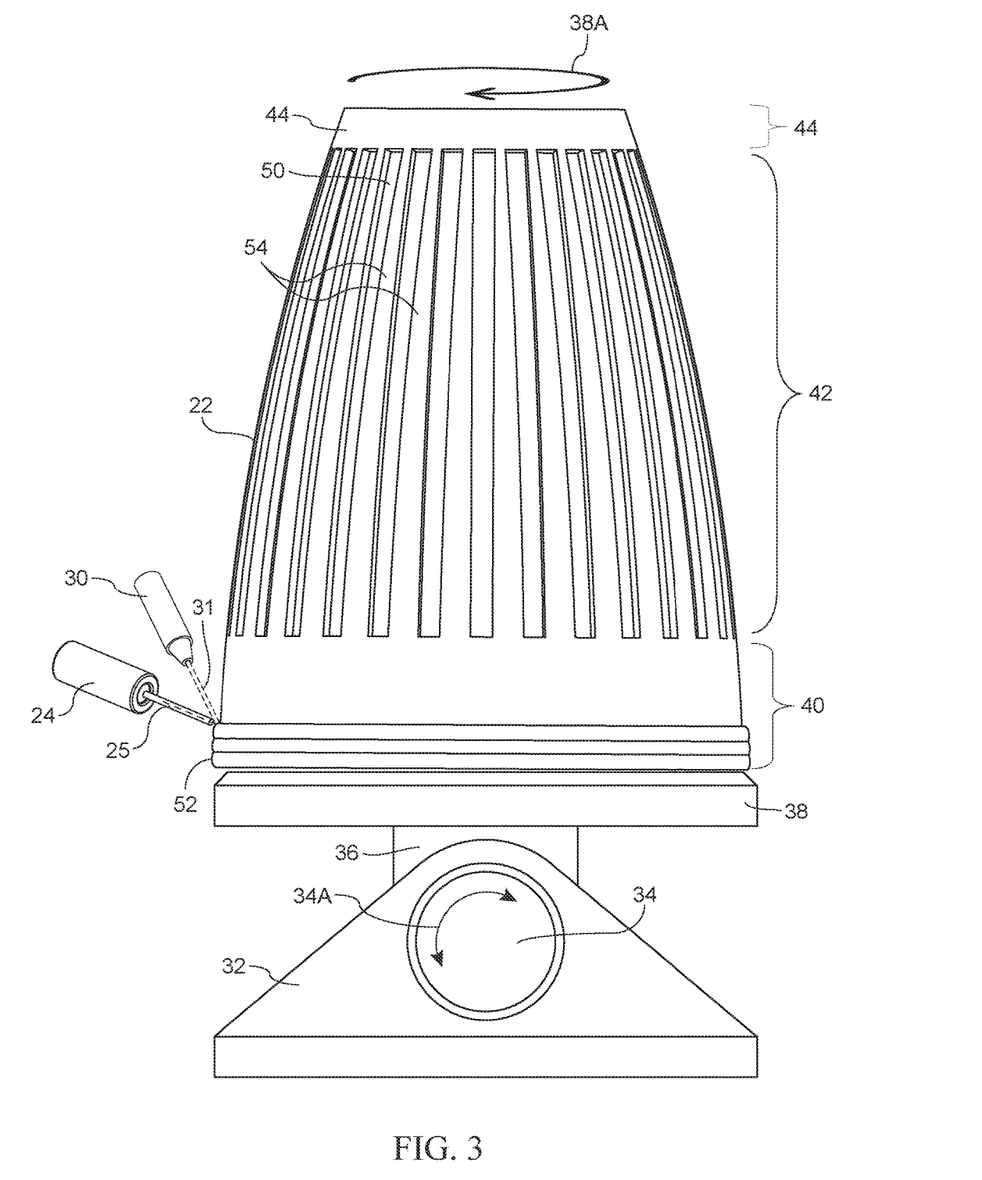
FIG. 3 is an isolated side view of a rocket nozzle's inner liner with coolant channels positioned on a turntable and showing the start of the freeform deposition method.

Referring additionally now to FIG. 3, the setup is illustrated for step 102. Specifically, inner liner 22 with integral coolant channels 50 is shown positioned on turntable 38. Inner liner 22 includes the following three areas: inner liner bottom stock region 40 that has a flat surface lacking coolant channels 50, coolant channel region 42 that includes coolant channels 50 that run the length of region 42, and inner liner top stock region 44 that includes a flat surface free of coolant channels 50. Arrow 38A indicates that turntable 38 can be rotated or repositioned during the freeform deposition closeout method. Turntable 38 can be rotated in a clockwise direction shown by arrow 38A or in a counter-clockwise direction without departing from the scope of the present invention. In response to instructions from computer 20 (not shown in FIG. 3), arm 36 is rotated by pivoting support 34 thereby changing the angle of turntable 38 with inner liner 22 thereon as indicated by arrow 34A.

Step 102 of the freeform deposition closeout method starts at bottom stock region 40 as wire fed from wire feed unit 24 is heated by energy source 30 to thereby weld a first linear row 52 of closeout material onto the bottom circumference of inner liner 22. For clarity of illustration, the wire feedstock material discharged from nozzle 25 of unit 24 has been omitted from the figures. Wire feed unit 24 can be held at any angle relative to the surface of inner liner 22 at its bottom stock region 40. The closeout material is deposited onto inner liner 22 in linear rows 52 so that each row 52 is welded to the previous row 52 and to portions of inner liner 22 to thereby start the formation of an external jacket. Energy source and purge unit 30 can be used to purge the backside of the weld to reduce defects. For clarity of illustration, wire feed unit 24 and energy source and purge unit 30 are shown as independent elements. However, it is to be understood that the functions of these two elements could be combined such that the wire feedstock and laser (or other energy beam) are collinear with one another without departing from the scope of the present invention. Furthermore, while FIG. 3 depicts inner liner 22 in an upright vertical position during step 102, it is to be understood that inner liner 22 could be tilted relative to vertical for step 102 without departing from the scope of the present invention.

Figure 4:
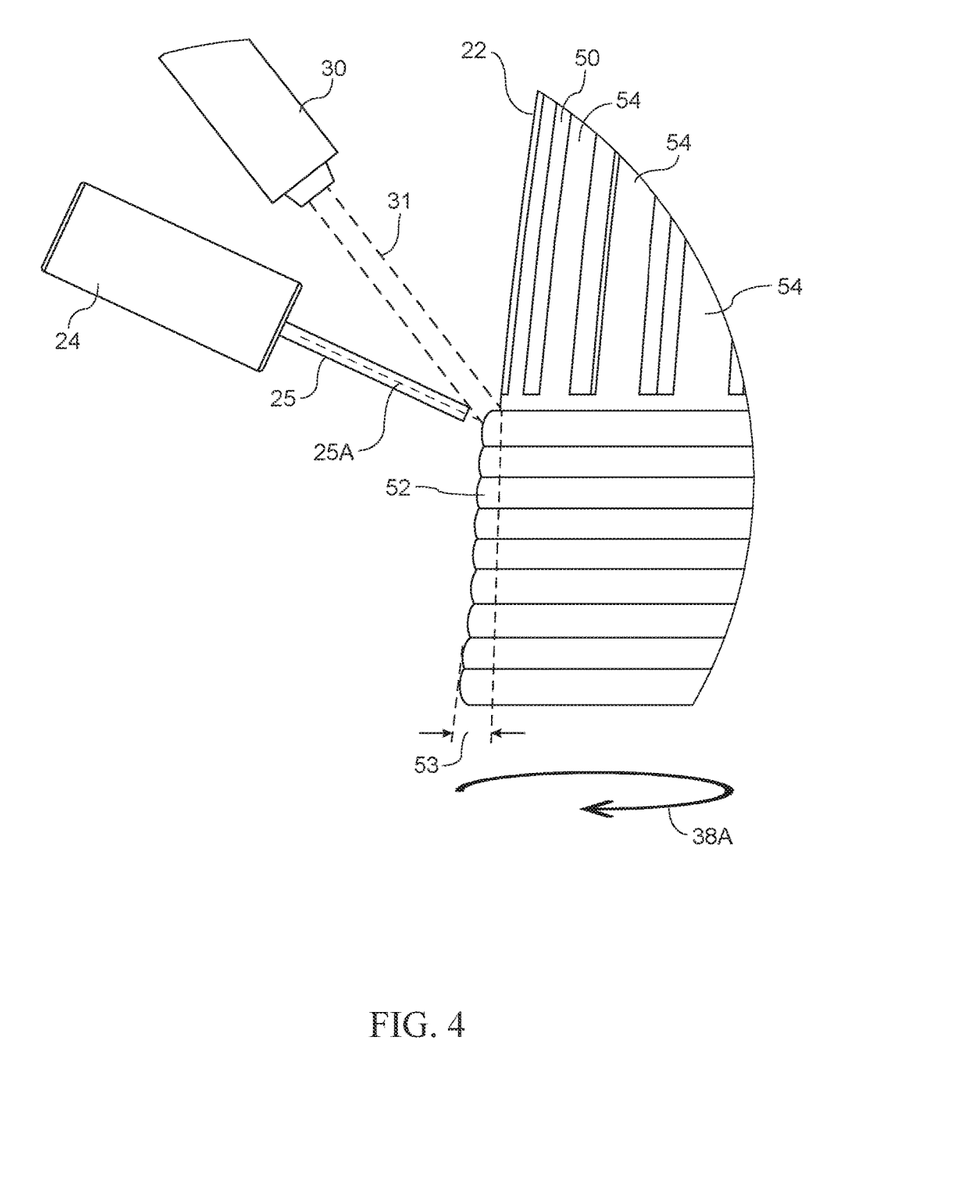
FIG. 4 is an enlarged view of the closeout material deposition region shown in FIG. 3.

FIG. 4 illustrates an enlarged view of the weld region in step 102. Each row 52 of closeout material has a width 53 measured from the external surface of inner liner 22 to the furthermost external surface of row 52. Laser beam 31 emitted from energy source and purge unit 30 has an energy level associated therewith sufficient to weld the metal (discharged from nozzle 25 of wire feed unit 24) to inner liner 22 and to an immediately adjacent row. Step 102 terminates prior to commencement of the closeout of coolant channels 50. In the illustrated embodiment, inner liner 22 is rotated, while wire feed unit 24 and energy source and purge unit 30 are held stationary. However, it is to be understood that inner liner 22 could remain stationary, while units 24 and 30 are rotated about inner liner 22 without departing from the scope of the present invention.

Figure 5:
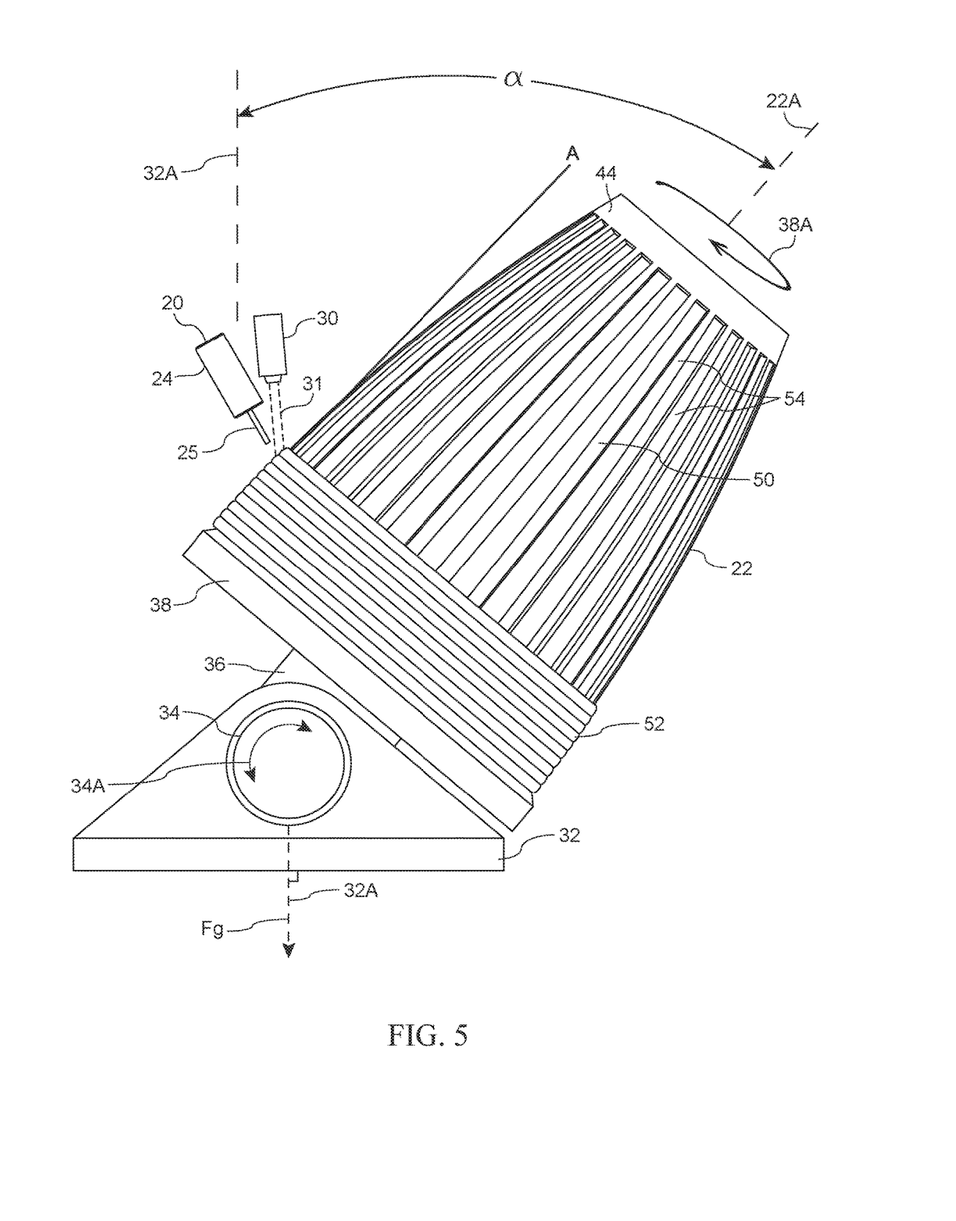
FIG. 5 is an isolated side view of the rocket nozzle's inner liner positioned on the turntable and showing the early stages of coolant channel closeout in accordance with an embodiment of the present invention.
Figure 6:
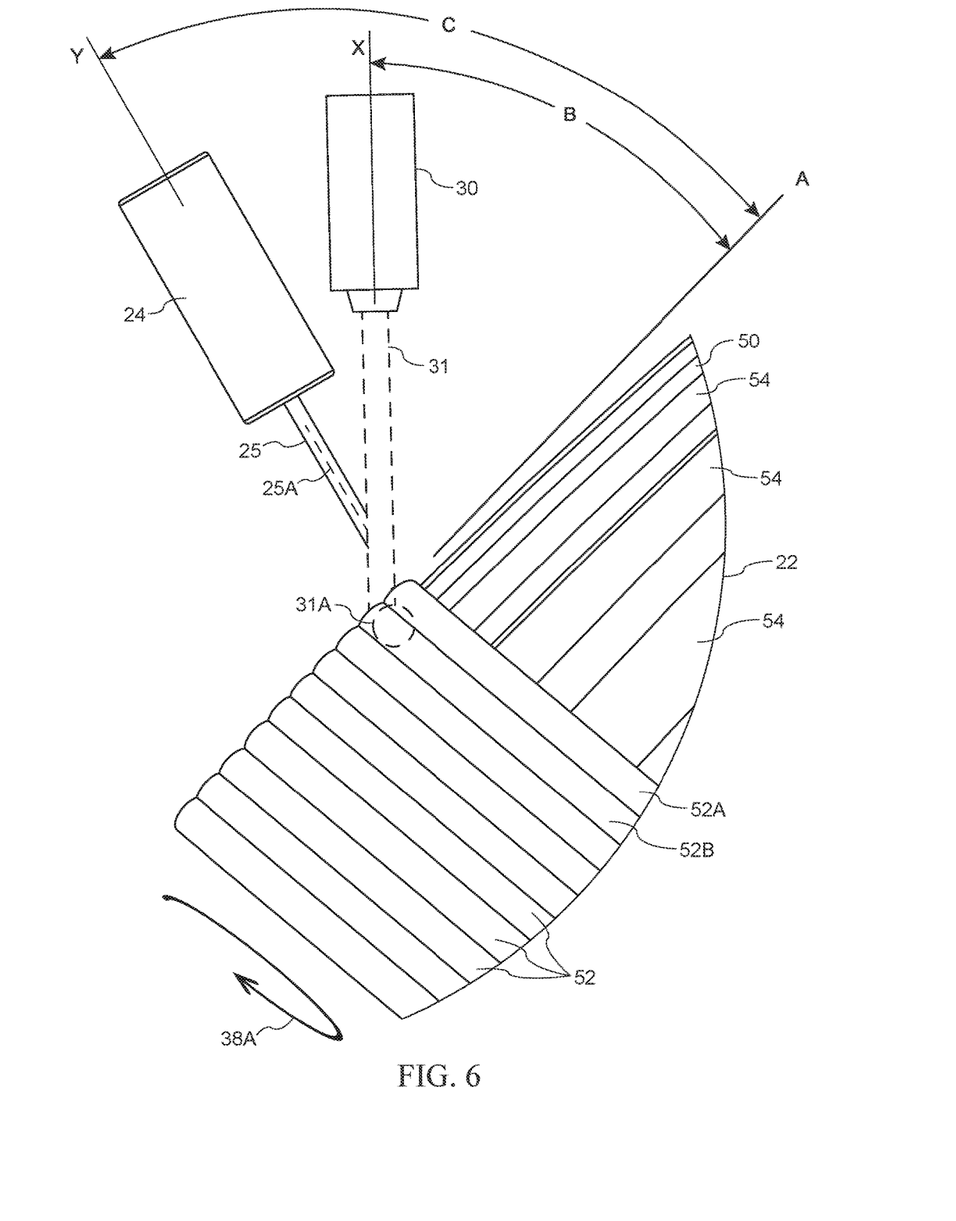
FIG. 6 is an enlarged view of the closeout material deposition region shown in FIG. 5 illustrating specified angular relationships and the distribution of weld energy in accordance with the present invention.

Referring now to FIGS. 5 and 6, the closeout of coolant channels 50 in accordance with the present invention will be described. FIGS. 5 and 6 illustrate the above-described method steps 104-112. In step 104, turntable 38, in response to instructions from computer 20 (not shown), is repositioned so that inner liner 22 is positioned at an angle α of 5-70° defined between the longitudinal axis 22A of inner nozzle 22 and a line 32A that is perpendicular to the support portion of base 32, i.e., aligned with the local force of gravity $F_g$. That is, line 32A would be aligned with longitudinal axis 22A when inner liner 22 is in a vertical orientation. Turntable 38 is rotated relative to base 32, while wire feed unit 24 and energy source and purge unit 30 are stationary. The angles of wire feed unit 24 and energy source and purge unit 30 are set so that the closeout material is deposited in rows 52 onto coolant lands 54 without entering coolant channels 50. Coolant channel lands 54 are the portions of the exterior surface of inner liner 22 remaining after the inner liner is slotted with coolant channels 50. Typically, rows 52 are deposited such that they are perpendicular to coolant channels 50 and lands 54.

To keep closeout material out of coolant channels 50 while also eliminating the use of filler materials in channels 50 that could contaminate the weld, specific angular relationships must be maintained between a tangent line "A" and the angles that the wire feed stock and the welding laser beam make with tangent line A. Tangent line A is a line of tangency of the exterior surface of inner liner 22 at lands 54 at the point of deposition for a particular row 52 of closeout material. Since inner liner 22 is contoured, tangent line A changes with positions along the length of inner liner 22. Steps 106 and 108 are implemented to achieve the following angular relationships. As shown in the enlarged view of FIG. 6, the angle that laser beam 31 (originating from unit 30) makes with tangent line A is referenced by angle "B", and the angle that the wire feedstock (not shown for reasons of clarity) makes with tangent line A is referenced by angle "C". As is known in the art, the end of nozzle 25 is generally positioned very close to inner liner 22. Accordingly, the longitudinal axis 25A of nozzle 25 will be aligned with the wire feedstock discharged from nozzle 25 such that angle B between tangent line A and the wire feedstock can be considered to be measured between tangent line A and the longitudinal axis 25A of nozzle 25. Throughout the closeout of coolant channels 50, angle B should be maintained in the range of 5-65° relative to tangent line A, and angle C should be maintained in the range of 20-90° relative to tangent line A.

In addition to maintaining the above-described angular relationships, the method of the present invention controls the amount of energy supplied by laser beam 31 to a currently-deposited row 52 by controlling the placement of the cross-sectional area of laser beam 31 impinging on the deposited rows 52. Accordingly, the present invention controls the position of unit 30 to distribute the energy of laser beam 31 as noted in step 110. More specifically, laser beam 31 is directed at the region of closeout material deposition such that less than 30 percent of the beam's energy is focused on the currently-deposited row 52A, while greater than 70 percent of the beam's energy is focused on the immediately adjacent and previously-deposited row 52B. The division of beam energy in this fashion prevents material from current row 52A from melting into a coolant channel 50, while welding current row 52A to lands 54 and to its adjacent and previously-deposited row 52B. The division of beam energy can be based on the cross-sectional area (indicated by dashed line circle 31A) of laser beam 31 as would be understood in the art.

Figure 7:
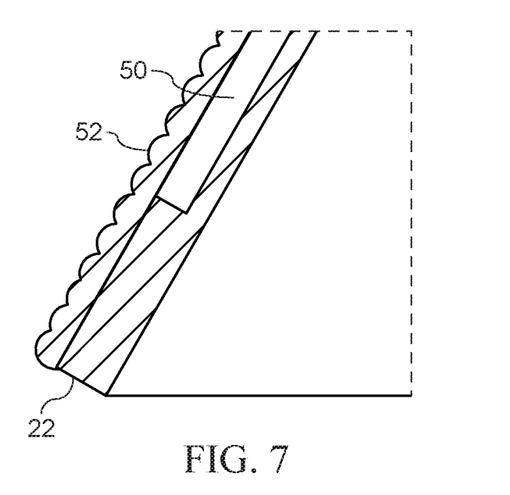
FIG. 7 is a portion of an axial cross-sectional view of the rocket nozzle's inner liner illustrating the closeout material covering a coolant channel.
Figure 8:
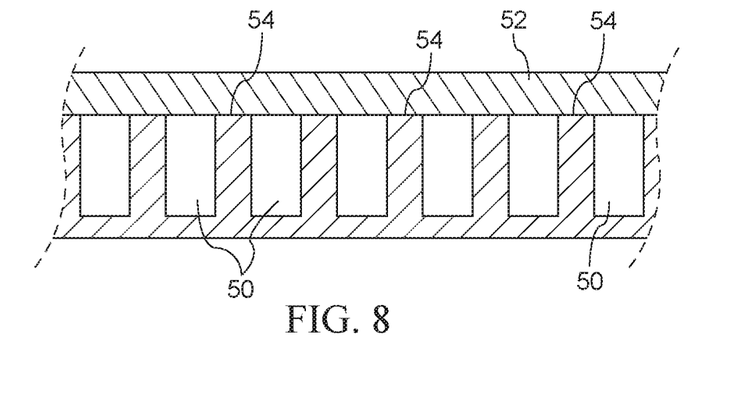
FIG. 8 is a portion of a radial cross-sectional view of the rocket nozzle's inner liner illustrating a single row of the closeout material covering a portion of the coolant channels.

The above-described processing steps are repeated in step 112 for each subsequent row 52 of the coolant channel closeout process. Step 112 includes the step of adjusting the above-described angular relationships of inner liner 22, the feedstock emitted from nozzle 25, and laser beam 31 emitted from energy source and purge unit 30. When coolant channel closeout is complete, the welded-together rows 52 cover coolant channels 50 (FIG. 7) with each row 52 circumscribing inner liner 22 and welded to lands 54 (FIG. 8).

Figure 9:
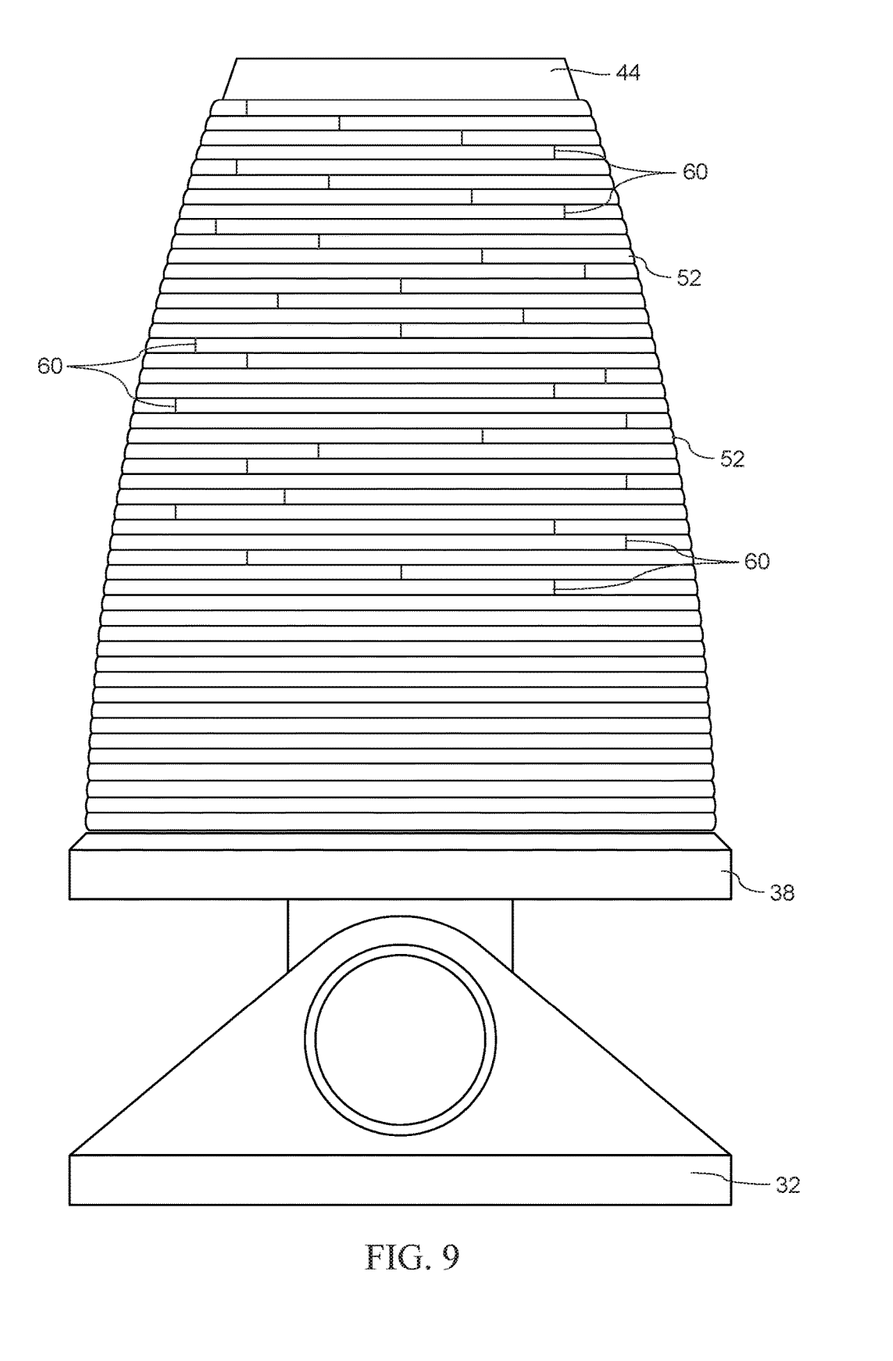
FIG. 9 is a side view of a rocket nozzle's inner liner with the coolant channel closeout being completed in accordance with an embodiment of the present invention.

After a deposited row 52 circumscribes inner liner 22, the various components described herein are adjusted as described above prior to deposition of a next row. As shown in FIG. 9, start/stop points 60 for deposited rows 52 can be staggered where such staggering can be random or regular without departing from the scope of the present invention. The present invention could also be practiced by spiraling the closeout material thereby eliminating intermediate start/stop points 60.

Figure 10:
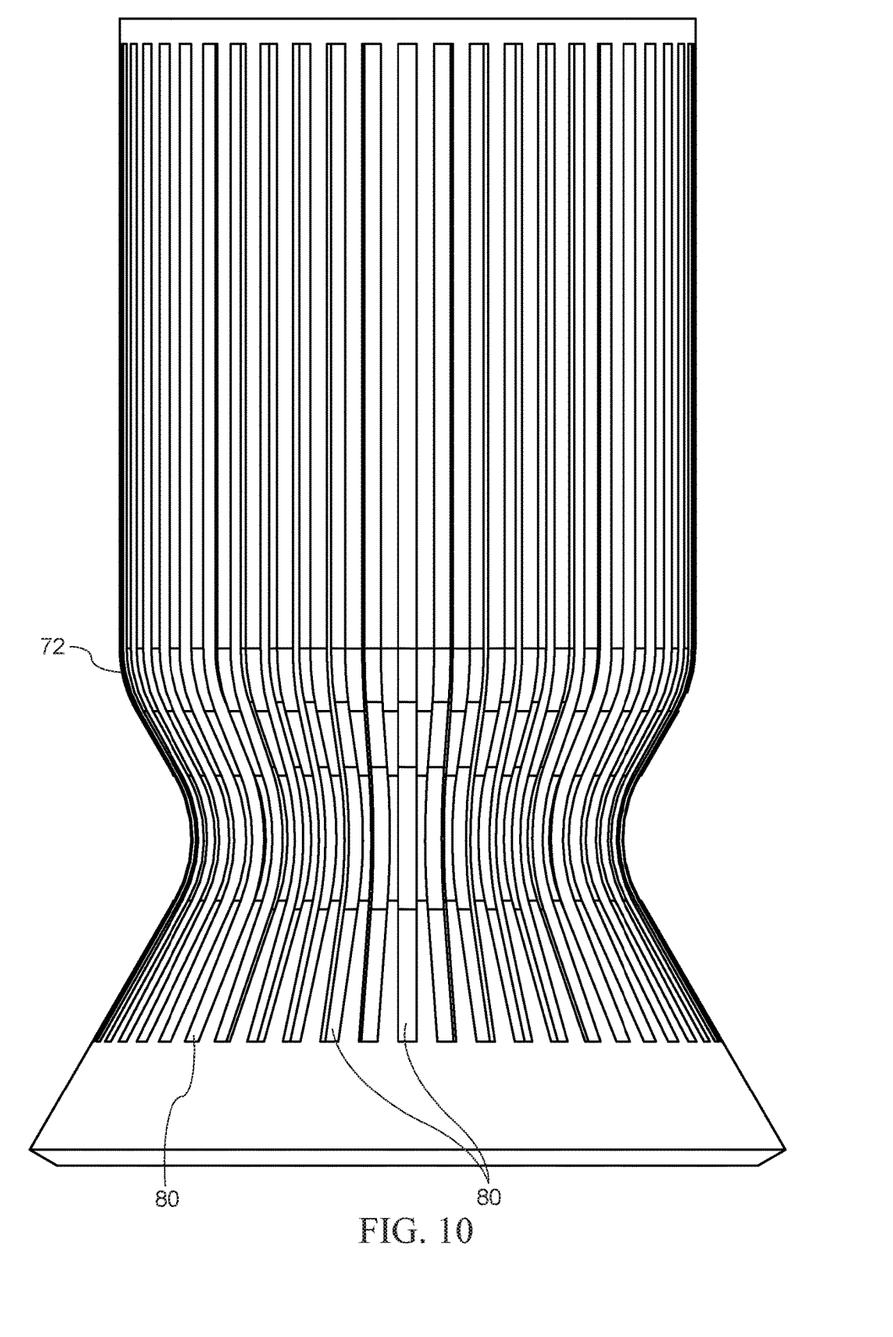
FIG. 10 is a side view of the rocket engine thrust chamber's inner liner with coolant channels formed therein.

As mentioned above, the present invention can be used to perform coolant channel closeout on a variety of rocket components and nuclear reactor components. Such components can include outer surfaces having complex curves such as those used on a rocket engine thrust chamber. For example and as illustrated in FIG. 10, a rocket engine thrust chamber inner liner 72 is shown having coolant channels 80. The above-described system and method would be implemented identically as described herein to closeout coolant channels 80.

The advantages of the present invention are numerous. The freeform deposition method fabricates an exterior jacket onto an inner liner's channel lands so that the coolant channels can withstand the high pressures and extreme temperatures produced during use of the liner. The method utilizes directed energy/fusion deposition of closeout material along the coolant channel lands of the inner liner eliminating the need to pre-fill the channels with a filler medium. The described method allows for real-time row-by-row inspection of the coolant channel closeout thereby permitting correction of any defects in the closeout welds during the fabrication process. The method will significantly reduce the overall time for fabrication of a rocket nozzle or rocket thrust chamber.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A method of fabricating a coolant channel closeout jacket, comprising the steps of:

providing a structure having coolant channels formed in an outer surface thereof wherein a line of tangency relative to said outer surface is defined for each point on said outer surface;

providing a feedstock supply for depositing linear rows of a metal feedstock onto said outer surface of said structure;

providing an energy source for generating a beam of weld energy having a cross-sectional area;

positioning said feedstock supply to deposit said linear rows of said metal feedstock onto a portion of said outer surface where said coolant channels are formed therein, wherein a first angle between said metal feedstock discharged from said feedstock supply and said line of tangency is maintained in a range of 20-90°; and positioning said energy source to direct said beam of weld energy towards a portion of said linear rows deposited on said portion of said outer surface, wherein less than 30% of said cross-sectional area of said beam of weld energy impinges on a currently-deposited one of said linear rows, and wherein a second angle between said beam of weld energy and said line of tangency is maintained in a range of 5-65°.

2. A method according to claim 1, further comprising the step of introducing relative rotation between said structure and a combination of said feedstock supply and said energy source, wherein each of said linear rows circumscribes said structure.

3. A method according to claim 1, wherein each of said linear rows is perpendicular to said coolant channels.

4. A method according to claim 1, wherein greater than 70% of said cross-sectional area of said beam of weld energy impinges on another one of said linear rows immediately adjacent to said currently-deposited one of said linear rows.

5. A method according to claim 1, wherein said structure has a longitudinal axis, and wherein said method further comprises the step of positioning said structure wherein an angle between said longitudinal axis of said structure and a local force of gravity is maintained in a range of 5-70°.

6. A method according to claim 1, further comprising the step of depositing additional linear rows of said metal feedstock on said outer surface where none of said coolant channels are formed.

7. A method of fabricating a coolant channel closeout jacket, comprising the steps of:

providing a structure having coolant channels formed in an outer surface thereof wherein a line of tangency relative to said outer surface is defined for each point on said outer surface;

directing a metal feedstock towards a portion of said outer surface of said structure where said coolant channels are formed therein, said metal feedstock being directed along a first angle between said metal feedstock and said line of tangency, said first angle being maintained in a range of 20-90°, wherein said metal feedstock is deposited in a linear row on said portion of said outer surface;

generating a beam of weld energy having a cross-sectional area; and directing said beam of weld energy towards said linear row wherein less than 30% of said cross-sectional area of said beam of weld energy impinges on said linear row, and wherein a second angle between said beam of weld energy and said line of tangency is maintained in a range of 5-65°.

8. A method according to claim 7, further comprising the step of rotating said structure about a longitudinal axis thereof during said steps of directing, wherein said linear row circumscribes said structure.

9. A method according to claim 7, wherein said linear row is perpendicular to said coolant channels.

10. A method according to claim 7, wherein another linear row of said metal feedstock lies immediately adjacent to said linear row, and wherein greater than 70% of said cross-sectional area of said beam of weld energy impinges on said another linear row.

11. A method according to claim 7, wherein said structure has a longitudinal axis, and wherein said method further comprises the step of positioning said structure wherein an angle between said longitudinal axis of said structure and a local force of gravity is maintained in a range of 5-70°.

12. A method according to claim 7, further comprising the step of depositing additional linear rows of said metal feedstock on said outer surface where none of said coolant channels are formed.

13. A method of fabricating a coolant channel closeout jacket, comprising the steps of:
   providing a structure having coolant channels formed in an outer surface thereof wherein a line of tangency relative to said outer surface is defined for each point on said outer surface;
   directing a metal feedstock towards a portion of said outer surface of said structure where said coolant channels are formed therein, said metal feedstock being directed along a first angle between said metal feedstock and said line of tangency, said first angle being maintained in a range of 20-90°, wherein said metal feedstock is deposited in a linear row on said portion of said outer surface;
   generating a beam of weld energy having a cross-sectional area;
   directing said beam of weld energy towards said linear row wherein less than 30% of said cross-sectional area of said beam of weld energy impinges on said linear row, and wherein a second angle between said beam of weld energy and said line of tangency is maintained in a range of 5-65°; and
   repeating said steps of directing until said coolant channels are covered by a plurality of said linear row.

14. A method according to claim 13, further comprising the step of rotating said structure about a longitudinal axis thereof during said steps of directing, wherein each said linear row circumscribes said structure.

15. A method according to claim 13, wherein each said linear row is perpendicular to said coolant channels.

16. A method according to claim 13, wherein another linear row of said metal feedstock lies immediately adjacent to said linear row, and wherein greater than 70% of said cross-sectional area of said beam of weld energy impinges on said another linear row.

17. A method according to claim 13, wherein said structure has a longitudinal axis, and wherein said method further comprises the step of positioning said structure wherein an angle between said longitudinal axis of said structure and a local force of gravity is maintained in a range of 5-70°.

18. A method according to claim 13, further comprising the step of depositing additional linear rows of said metal feedstock on said outer surface where none of said coolant channels are formed.

\* \* \* \* \*